J. A. FREY.
WATER-HEATER FOR STOVES.

No. 178,755.  Patented June 13, 1876.

2 Sheets—Sheet 1.

WITNESSES:
Jas. E. Hutchinson
John R. Young

INVENTOR:
Jno. A. Frey, by
Prindle and Co., his attys

UNITED STATES PATENT OFFICE.

JOHN A. FREY, OF WASHINGTON, DISTRICT OF COLUMBIA.

IMPROVEMENT IN WATER-HEATERS FOR STOVES.

Specification forming part of Letters Patent No. 178,755, dated June 13, 1876; application filed March 30, 1876.

*To all whom it may concern:*

Be it known that I, JOHN A. FREY, of Washington city, in the county of Washington, and in the District of Columbia, have invented certain new and useful Improvements in Detachable Water-Heaters for Stoves; and do hereby declare that the following is a full, clear, and exact description thereof, reference being had to the accompanying drawings, making a part of this specification, in which—

Figure 1:
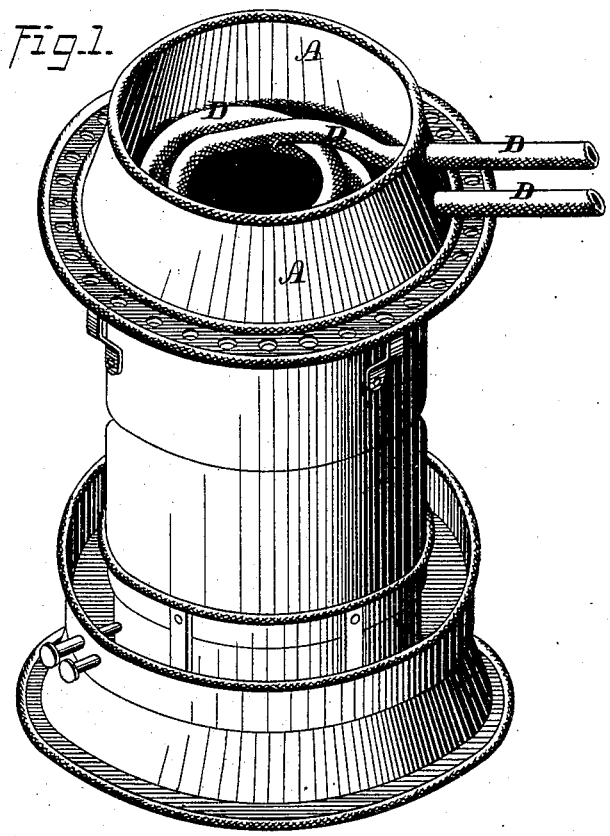
Figure 2:
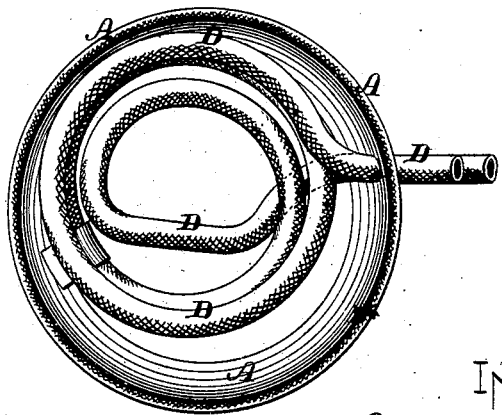
Figure 3:
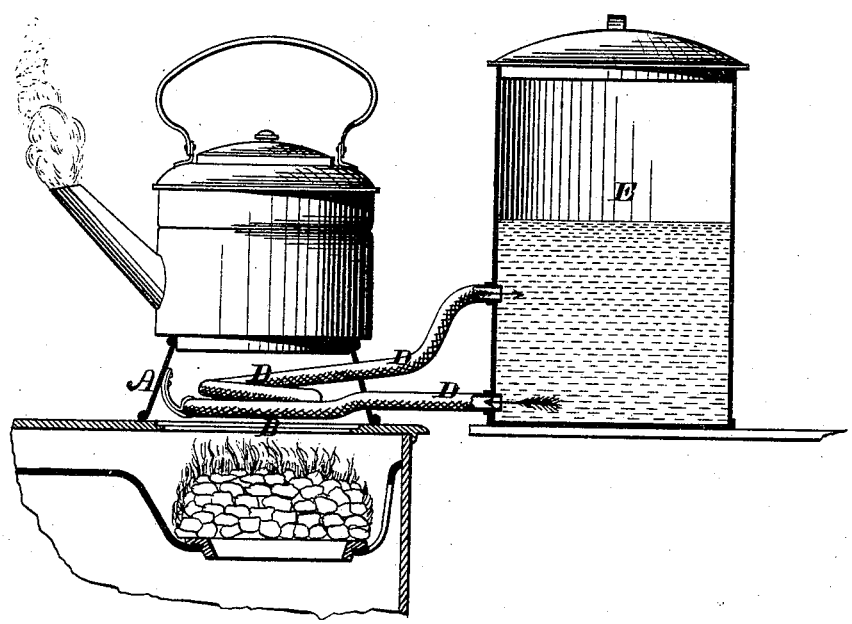

Figure 1 is a perspective view of the upper side of my improved device, in position for use upon a stove. Fig. 2 is a plan view of the lower side of the same; and Fig. 3 is a vertical central section upon a line passing through my heater, and through a boiler attached thereto.

Letters of like name and kind refer to like parts in each of the figures.

The design of my invention is to enable water to be easily and quickly heated without interference with the ordinary uses of a cooking-stove; and to this end it consists in a water-heater contained within a suitable casing, which casing is open at its upper and lower sides, may be placed over the boiler-hole of a stove, and at its upper side is adapted to receive and contain a cooking utensil, substantially as and for the purpose hereinafter specified.

In the annexed drawings, A represents a metal casing, which is circular in plan view, is tapering from its lower end upward, and has, preferably, such horizontal dimensions as to enable its lower end to cover the boiler-opening B of a stove, and its upper end to receive the cover of said opening, or any cooking utensil intended for use upon the latter. Within the casing A is placed a water-pipe, D, which is formed of wrought metal, and has any desired form that will permit the heated gases of combustion to pass freely around each part, and to reach the upper portion of said casing. The ends of the pipe D pass outward through the casing A and terminate within a boiler or reservoir, E, the arrangement being that usually adopted to insure a circulation of water from the lower portion of said reservoir through said pipe and into the former at a higher point.

The ends of the pipe D may be permanently or temporarily connected with the boiler E; but if the latter, then said boiler may be made a fixture, and have any desired dimensions, while a permanent connection between the said heater and boiler could only be employed in case the latter was easily removable.

The operation of the device is as follows: A boiler-opening, B, is uncovered and the heater placed in position over the same, after which the upper end of the latter is inclosed by means of the cover, or by a cooking utensil. The ends of the pipe D being connected with a boiler, E, as described, and the latter filled with water, the operation of heating such water will proceed in the same manner as though the usual "water-back" was employed within the fuel-chamber for such purpose.

If desired, the apparatus may be permitted to remain upon the stove at all times, as it does not lessen the effective capacity of the latter for any ordinary work; but usually said apparatus will be removed whenever the occasion for its use has passed.

Having thus fully set forth the nature and merits of my invention, what I claim as new is—

A water-heater contained within a casing, which casing is open at its upper and lower sides, may be placed over the boiler-hole of a stove, and at its upper side is adapted to receive and contain a cooking utensil, substantially as and for the purpose specified.

In testimony that I claim the foregoing I have hereunto set my hand this 22d day of March, 1876.

JOHN A. FREY.

Witnesses:
A. RIESSNER,
T. RIESSNER.